United States Patent
Numata

(10) Patent No.: US 11,178,371 B2
(45) Date of Patent: Nov. 16, 2021

(54) IMAGE PROCESSING APPARATUS, IMAGING SYSTEM, RECORDING MEDIUM, AND CONTROL METHOD

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/674,437

(22) Filed: Nov. 5, 2019

(65) Prior Publication Data
US 2020/0154087 A1   May 14, 2020

(30) Foreign Application Priority Data
Nov. 12, 2018  (JP) .............................. JP2018-212461

(51) Int. Cl.
*H04N 9/73* (2006.01)
*H04N 1/60* (2006.01)
*H04N 5/33* (2006.01)

(52) U.S. Cl.
CPC .......... *H04N 9/735* (2013.01); *H04N 1/6077* (2013.01); *H04N 5/332* (2013.01)

(58) Field of Classification Search
CPC ...... H04N 9/735; H04N 1/6077; H04N 5/332; H04N 1/6086

USPC ................ 348/335, 340, 345, 348, 350, 352
See application file for complete search history.

(56) References Cited

U.S. PATENT DOCUMENTS

| | | | |
|---|---|---|---|
| 2010/0103268 A1* | 4/2010 | Tokuyama | H04N 9/77 348/162 |
| 2016/0125575 A1* | 5/2016 | Takahashi | G06T 5/50 382/275 |
| 2020/0033701 A1 | 1/2020 | Numata | |
| 2020/0098148 A1 | 3/2020 | Numata | |
| 2020/0137293 A1 | 4/2020 | Numata | |

FOREIGN PATENT DOCUMENTS

JP   2013247492 A   12/2013

* cited by examiner

*Primary Examiner* — Yogesh K Aggarwal
(74) *Attorney, Agent, or Firm* — Carter, DeLuca & Farrell LLP

(57) ABSTRACT

An image capturing apparatus that can obtain an optimum image in accordance with a region of interest of a user is provided. An image processing apparatus comprises an image synthesis unit configured to synthesize a visible light image and an infrared light image and generate a synthesis image; a region specifying unit configured to specify a region in the synthesis image; and an evaluation unit configured to evaluate the saturation of the synthesis image in a region specified by the region specifying unit. The image synthesis unit changes the synthesis ratio of the visible light image and the infrared light image in the synthesis image in accordance with the saturation that has been evaluated by the evaluation unit.

18 Claims, 5 Drawing Sheets

US 11,178,371 B2

IMAGE PROCESSING APPARATUS, IMAGING SYSTEM, RECORDING MEDIUM, AND CONTROL METHOD

BACKGROUND OF THE INVENTION

Field of the Invention

The present invention relates to an image processing apparatus, an imaging system, a recording medium, and a control method thereof.

Description of the Related Art

In an image capturing apparatus for a monitoring use and the like, acquiring a clear object image may be requested even under low illumination, such as at night. As an image capturing apparatus that can acquire a clear object image even under a low illumination, an image capturing apparatus that includes an image capturing element that is sensitive to an infrared light in addition to an image capturing element that is sensitive to a visible light and synthesizes image signals acquired by the two image capturing elements and displays the synthesized signal has been proposed (Japanese Unexamined Patent Application, First Publication No. 2013-247492). In Japanese Unexamined Patent Application, First Publication No. 2013-247492, synthesis parameters during synthesis processing are automatically determined in accordance with a shooting environment. However, there are cases in which an image desired by the user cannot be acquired depending on a region of interest of a user.

It is therefore an object of the present invention to provide an image capturing apparatus that can acquire an optimum image in accordance with a region of interest of a user.

SUMMARY OF THE INVENTION

An image processing apparatus comprising: an image synthesis unit configured to synthesize a visible light image and an infrared light image and generate a synthesis image; a region specifying unit configured to specify a region in the synthesis image; and an evaluation unit configured to evaluate the saturation of the synthesis image in a region specified by the region specifying unit, wherein the image synthesis unit changes the synthesis ratio of the visible light image and the infrared light image in the synthesis image in accordance with the saturation that has been evaluated by the evaluation unit.

Further features of the present invention will become apparent from the following description of exemplary embodiments with reference to the attached drawings.

DESCRIPTION OF THE EMBODIMENTS

Hereinafter, an image capturing apparatus according to the embodiments of the present invention will be described with reference to the drawings. In this case, those having the same function in all the drawings are denoted by the same numerals, and the repetitive description thereof will be omitted.

First Embodiment

Figure 1:
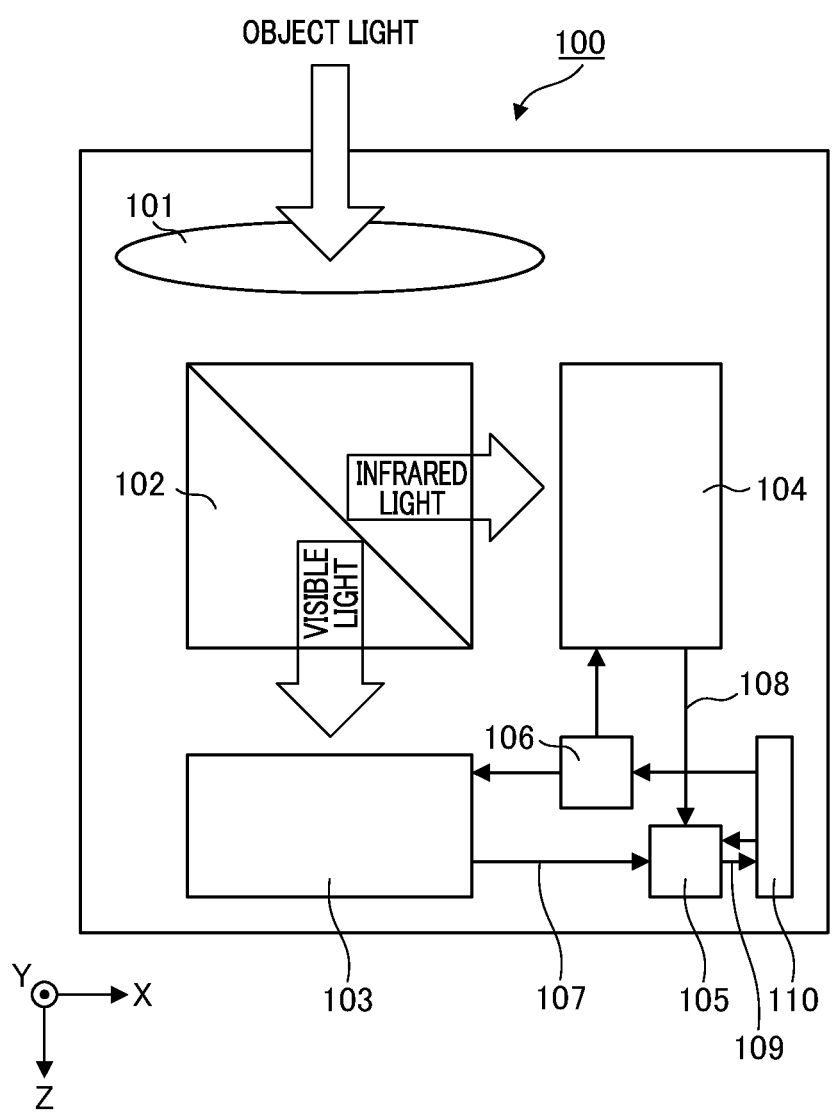
FIG. 1 is a block diagram of an image capturing apparatus according to the first embodiment.

An image capturing apparatus according to the present embodiment is shown in FIG. 1. In FIG. 1, an image capturing apparatus 100 includes an imaging optical system 101, a light separating unit 102, a first image capturing element 103, a second image capturing element 104, a synthesis processing unit 105, a control unit 106, and a region-of-interest selecting unit 110.

The light separating unit 102 separates light incident through the imaging optical system 101 into the first image capturing element 103 and the second image capturing element 104. Specifically, the light separating unit 102 is configured by a wavelength selection prism, and is configured such that light having a wavelength that is shorter than a wavelength of a specific threshold (visible light) is transmitted through the wavelength selection prism, a light having a wavelength that is longer than a wavelength of the specific threshold (an infrared light) is reflected by the wavelength selection prism. Note that in this context, "transmitted/reflected" means that 80% or more of the light is transmitted/reflected.

Figure 2:
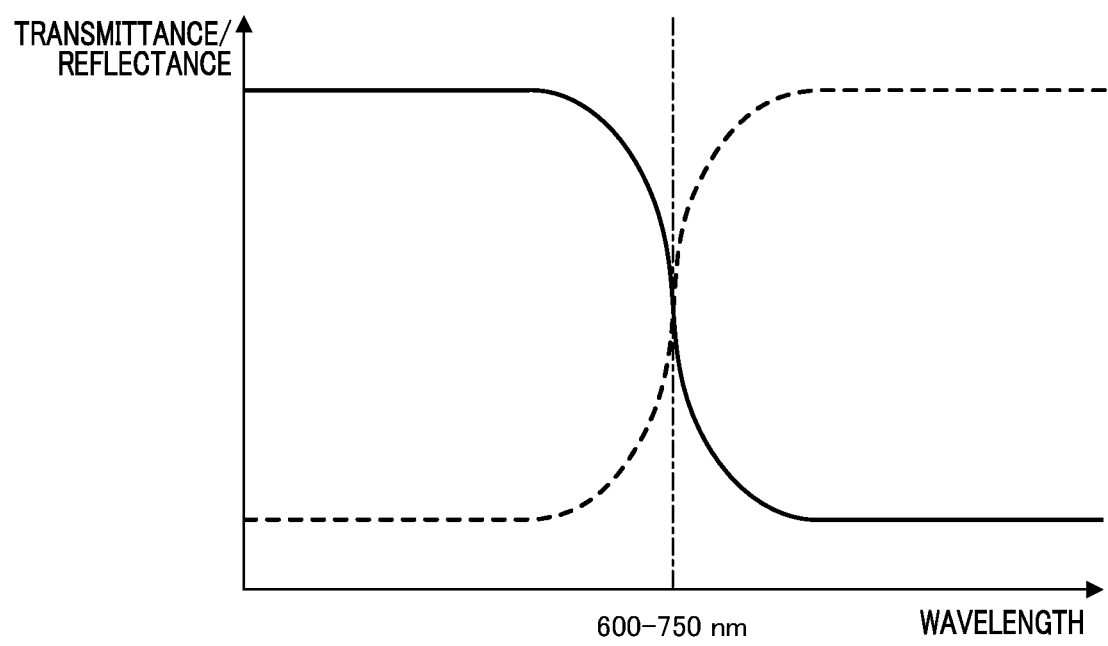
FIG. 2 is a spectral distribution diagram of a wavelength selection prism.

Specifically, visible light is incident to the first image capturing element 103, and infrared light is incident to the second image capturing element 104. In this context, the specific threshold is 600 nm or more and 750 nm or less. Specifically, the boundary between the visible light and the infrared light is defined as 600 nm or more and 750 nm or less. Additionally, "infrared light" means light having a wavelength from a specific threshold to 2500 nm. FIG. 2 illustrates an example of a spectral transmission spectrum and a spectral reflection spectrum of the wavelength selection prism. The solid line shows transmission and the dotted line shows reflection.

The first image capturing element 103 is sensitive to at least a visible light and the second image capturing element 104 is sensitive to at least an infrared light. For example, if Si is used for a material of a photoelectric conversion unit, an image capturing element that is sensitive to light having a wavelength of 380 nm or more and 1100 nm or less can be realized. Therefore, the photoelectric conversion units of the first image capturing element 103 and the second image capturing element 104 may be formed by Si. Note that, as the first image capturing element 103 and the second image capturing element 104, for example, a CCD or CMOS image capturing element, can be used.

The pixels in the first image capturing element 103 include on-chip color filters having an RGB Bayer arrangement, and a first image signal 107 in RGB format that has been output from the first image capturing element 103 includes color information in addition to luminance information. In contrast, a second image signal 108 that has been output from the second image capturing element 104 includes only the luminance information. Note that the first image capturing element 103 only has to have a sensitivity distribution, principally, with reference to a visible light, where a sensitivity distribution with respect to a light other than the visible light may be included.

Additionally, the second image capturing element 104 only has to have a sensitivity distribution, principally, with reference to an infrared light, where a sensitivity distribution with respect to a light other than the infrared light may be included. The driving of the first image capturing element 103 and the second image capturing element 104 and the readout of the image signals are controlled by the control unit 106. The control unit 106 includes a computer such as a CPU and a memory. Note that the memory stores a computer program for causing the CPU to execute an operation of the flowchart to be described below. The control unit 106 also includes a driving circuit for controlling operations of various circuits based on instructions from the CPU.

The synthesis processing unit 105 synthesizes the first image signal 107 and the second image signal 108, and generates a third image signal 109. Specifically, for example, the following processing is performed. First, the first image signal 107 read out in RGB format is demosaiced, developed, and converted into image signals in YUV format. The YUV signals obtained from the first image signal 107 at this time are respectively denoted by "Y1", "U1", and "V1". Similarly, the second image signal 108 is also developed and converted into an image signal in YUV format. At this time, the Y signal of the second image signal 108 is denoted by "Y2". Note that the second image signal 108 has no color information and the values of U and V are 0.

Next, the Y1 signal and the Y2 signal are synthesized to generate the third image signal 109. Specifically, when the YUV signals of the third image signal 109 are denoted by "Y3", "U3", and "V3", the third image signal 109 is generated by using the following formulae:

$$Y3 = \alpha \times Y1 + (1-\alpha) \times Y2 \qquad \text{(Formula 1)}$$

$$U3 = U1 \qquad \text{(Formula 2)}$$

$$V3 = V1 \qquad \text{(Formula 3)}$$

Here, α is a real number of 0 or more and 1 or less. As can be seen from the formula 1, with respect to the luminance information determined by the Y signal, as the value of a becomes larger, the third image signal 109 becomes close to the first image signal 107, and as the value of a becomes smaller, the third image signal 109 becomes close to the second image signal 108. As for the color information determined by the ratio of the U signal, the V signal, and the Y signal, as the value of a becomes larger, the third image signal 109 becomes close to the first image signal 107, and as the value of a becomes smaller, the third image signal 109 becomes close to the second image signal 108. That is, the synthesis ratio of the first image signal 107 and the second image signal 108 is changed due to the change of the value of a.

In many cases, an infrared light component is stronger than a visible light component under a low illumination, such as at night. Therefore, it is possible to obtain the third image signal 109 that has a better SN (signal-to-noise) ratio compared to the first image signal 107, and has both the luminance information and the color information due to the synthesis processing performed by the synthesis processing unit 105.

As a result for the formula 1, as the value of a becomes larger, the third image signal 109 becomes close to the first image signal 107, and thereby an image signal that has an excellent color reproducibility is obtained. In contrast, as the value of a becomes smaller, the third image signal 109 becomes close to the second image signal 108 so that an image signal that has an excellent the SN ratio is obtained. Specifically, the color reproducibility and the SN ratio are in a trade-off relationship, and it is possible to change which of the SN ratio or the color reproducibility is to be emphasized by controlling the value of a.

In the case where the illuminance of the shooting environment is measured and the value of α is determined in accordance with the measured illuminance, a may be set larger as the illuminance is higher and, in contrast, a may be set smaller as the illuminance is lower. Thus, it is possible to generate a synthesis image with an emphasis on the color reproducibility as the illuminance is higher, and is possible to generate a synthesis image with an emphasis on the SN ratio as the illuminance is lower. However, even if the illuminance is the same, there are different situations in which the color reproducibility is desired to be emphasized or the SN ratio is desired to be emphasized, depending on the region of interest of the user. In the image capturing apparatus 100 according to the present embodiment, whether the color reproducibility or the SN ratio is to be emphasized is switched depending on the region of interest of the user. A detailed description will be given below.

Figure 3:
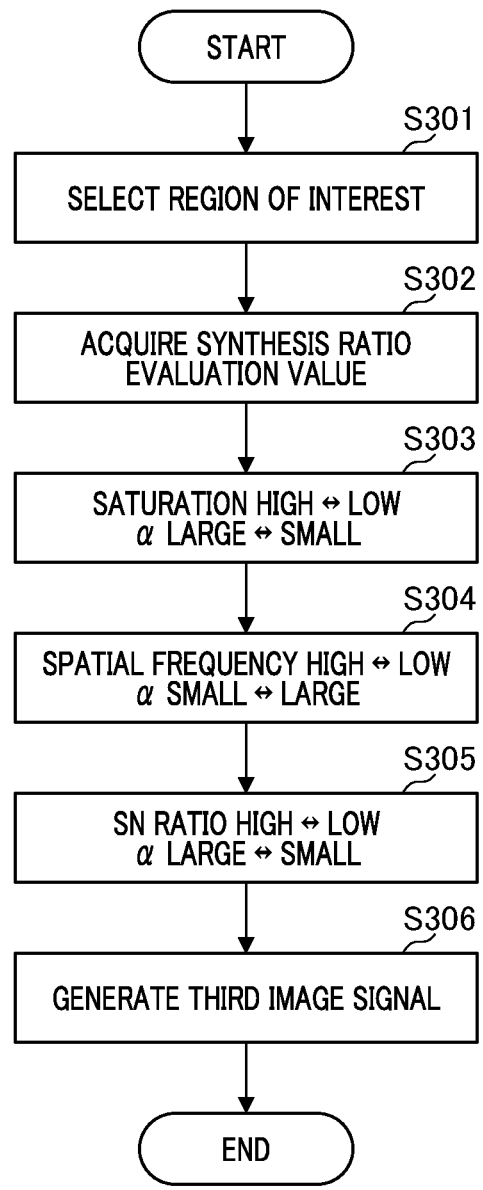
FIG. 3 is a flowchart illustrating an operation according to the first embodiment.
Figure 4:
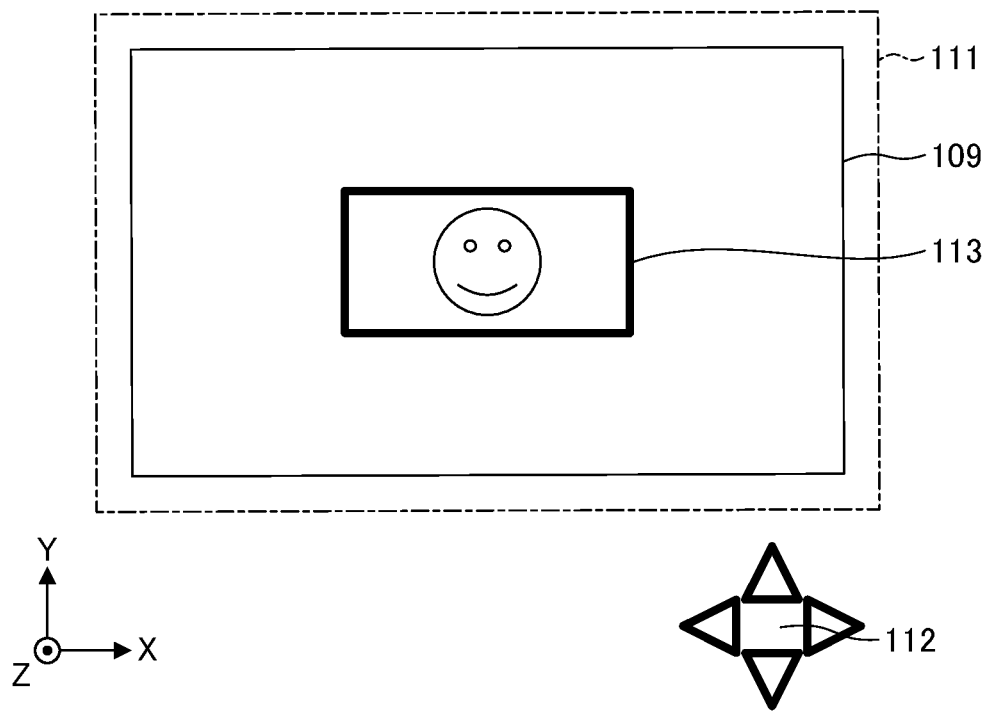
FIG. 4 illustrates a region of interest.

FIG. 3 is a flowchart illustrating an operation in the present embodiment. Each step can be executed by the control of each unit of the image capturing apparatus 100 performed by the control unit 106. First, in step S301, a region of interest, which is a region interested by a user, is selected (or specified). Here, a method for selecting a region of interest will be described. FIG. 4 illustrates a region of interest. The region-of-interest selecting unit 110 includes a display unit 111 that displays the third image signal 109 generated by the synthesis processing unit 105, and an interface 112 that selects a region-of-interest 113 that of interest to a user in the displayed third image signal 109. Upon selection of the region-of-interest 113 by the user by using the interface 112 such as a cursor or a touch panel, the region-of-interest 113 is displayed superimposed on the third image signal 109 that is displayed on the display unit 111.

Note that the image capturing apparatus 100 itself does not have to include the display unit 111 and the interface 112. For example, the image capturing apparatus 100 may transfer the third image signal 109 to a client apparatus via the network, and the user may select the region-of-interest 113 by using a display unit or an interface disposed on the client apparatus side. In this case, the client apparatus may also include the region-of-interest selecting unit 110.

Furthermore, the synthesis processing unit 105 may also be disposed on the client apparatus side, the image capturing apparatus 100 may transmit the first image signal and the second image signal to the client apparatus in accordance with an instruction from the client apparatus, and synthesis may be performed on the client apparatus side.

Returning to FIG. 3, in step S302, the synthesis processing unit 105 obtains a synthesis evaluation value of the region-of-interest 113. That is, a synthesis ratio evaluation value is obtained based on the region-of-interest 113 in the third image signal 109, and it is determined whether the color reproducibility or the SN ratio is to be emphasized. More specifically, a synthesis evaluation value is obtained by using any one of the saturation, the spatial frequency, and the SN ratio of the region-of-interest 113, or a plurality of pieces of information thereof, and consequently a synthesis ratio is determined. Note that the synthesis evaluation value may be obtained by using not only the region-of-interest 113 of the third image signal 109, but also other information. For example, the synthesis evaluation value may be obtained by using the saturation, the spatial frequency, and the SN ratio of the region corresponding to the region-of-interest 113 in the first image signal 107 and the region corresponding to the region-of-interest 113 in the second image signal 108.

In step S303, the synthesis processing unit 105 determines a value of a in accordance with the saturation of the region-of-interest 113. If the saturation of the region-of-interest 113 is low, the importance of the color information is low. Therefore, if the saturation of the region-of-interest 113 is low, the synthesis processing unit 105 generates the third image signal 109 with an emphasis on the SN ratio rather than the color reproducibility. In contrast, if the saturation of the region-of-interest 113 is high, the importance of the color information is high. Therefore, if the saturation of the region-of-interest 113 is high, the third image signal 109 is generated with an emphasis on the color reproducibility rather than the SN ratio. As described above, as the value of α is larger, the synthesis ratio of the first image signal 107 increases and the third image signal 109 becomes close to the first image signal 107, resulting in that an image having an excellent color reproducibility is generated.

Specifically, for example, a value to be added or subtracted from a may be set in advance in accordance with the saturation value. Additionally, a threshold D1 for comparison with the saturation of the region-of-interest 113 is set, and if the saturation is lower than the threshold D1, the value of a may be set smaller with an emphasis on the SN ratio rather than on the color reproducibility, and if the saturation is the threshold D1 or more, the value of a may be set larger with an emphasis on the color reproducibility rather than the SN ratio. Further, the value of a corresponding to the saturation value may be set in advance. In this case, for example, as the saturation value of the color of the region-of-interest 113 becomes higher, the value of α is set higher. Thus, as the saturation becomes higher, the synthesis ratio of the first image signal 107 increases and the third image signal 109 becomes close to the first image signal 107, resulting in that the third image signal 109 having an excellent color reproducibility can be generated.

Next, in step S304, the synthesis processing unit 105 determines a value of a in accordance with the spatial frequency of the texture in the region-of-interest 113. If the spatial frequency of the texture in the region-of-interest 113 is low, the user can visually recognize the texture even if the SN ratio of the image is small. Hence, if the spatial frequency of the texture in the region-of-interest 113 is low, the third image signal 109 is generated with an emphasis on the color reproducibility rather than the SN ratio. In contrast, if the spatial frequency of the texture in the region-of-interest 113 is high, it becomes difficult for the user to visually recognize the texture accurately unless the image has a large SN ratio. Accordingly, if the spatial frequency of the texture in the region-of-interest 113 is high, the third image signal 109 is generated with an emphasis on the SN ratio rather than the color reproducibility. As described above, as the value of a becomes smaller, the synthesis ratio of the second image signal 108 increases and the third image signal 109 comes close to the second image signal 109, resulting in that an image having an excellent SN ratio is obtained.

Specifically, for example, a value to be added or subtracted from a may be set in advance in accordance with the value of the spatial frequency. Additionally, a threshold D2 for comparison with the spatial frequency of the texture in the region-of-interest 113 may be set. In this case, in the case where the spatial frequency is higher than the threshold D2, the value of a may be set smaller with an emphasis on the SN ratio rather than the color reproducibility, and in the case where the spatial frequency is the threshold D2 or less, the value of a may be set larger with an emphasis on the color reproducibility rather than the SN ratio. Further, a value of a corresponding to the value of the spatial frequency may be set in advance. In this case, for example, as the spatial frequency of the texture in the region-of-interest 113 is higher, the value of a is set smaller. Hence, as the spatial frequency is higher, the synthesis ratio of the second image signal 108 increases and the third image signal 109 becomes close to the second image signal 108, resulting in that the third image signal 109 that has an excellent SN ratio can be generated.

Next, in step S305, the synthesis processing unit 105 determines a value of a in accordance with the SN ratio of the region-of-interest 113. If the SN ratio of the region-of-interest 113 is low, the third image signal 109 is generated with an emphasis on the SN ratio. In contrast, if the SN ratio of the region-of-interest 113 is high, sufficient image visibility can be obtained without a further increase in the SN ratio, so that the third image signal 109 is generated with an emphasis on the color reproducibility. As described above, as the value of a becomes smaller, the synthesis ratio of the second image signal 108 increases and the third image signal 109 becomes closer to the second image signal 108, resulting in that an image having an excellent SN ratio can be obtained.

Specifically, for example, a value to be added or subtracted from a may be set in advance in accordance with the value of the SN ratio. Additionally, a threshold D3 for comparison with the SN ratio of the region-of-interest 113 may be set. In this case, if the SN ratio is lower than the threshold D3, the value of a may be set smaller with an emphasis on the SN ratio rather than the color reproducibility, and if the SN ratio is the threshold D3 or more, the value of a may be set larger with an emphasis on the color reproducibility rather than the SN ratio. Further, a value of a corresponding to the value of the SN ratio may be set in advance. In this case, for example, as the value of the SN ratio of the region-of-interest 113 becomes higher, the value of α is set larger. Accordingly, as the SN ratio becomes higher, the synthesis ratio of the first image signal 107 increases and the third image signal 109 becomes closer the first image signal 107, resulting in that the third image signal 109 that has an excellent SN ratio can be generated.

Note that the SN ratio is a value obtained by dividing an average value of the luminance of a portion where a texture does not exist in the region-of-interest 113 by a standard deviation of luminance. The maximum value, the average value, or the intermediate value in the region-of-interest 113 may be obtained for the color saturation, the spatial frequency of the texture, and the SN ratio. Subsequently, in step S305, the synthesis processing unit 105 generates the third image signal 109 by using a determined in the above step. In this way, it is possible to obtain an optimum image corresponding to the region of interest of the user.

Note that, in the present embodiment, although the example has been described in which α is determined by using all of the saturation, the spatial frequency, and the SN ratio of the region-of-interest 113, a may be determined by using any one of the saturation, the spatial frequency, and the SN ratio, or by using a plurality of pieces of information thereof as described above, and the present invention is not limited thereto. Although FIG. 3 illustrates a case in which α is determined (added or subtracted) in the order of the saturation, the spatial frequency, and the SN ratio of the region-of-interest 113, this order does not necessarily have to be used. Additionally, after step S306, the user may check the display state of the third image signal 109 and further set a manually (fine adjustment). In this case, for example, the user performs fine adjustment by using the interface 112.

Furthermore, whether the SN ratio or the color reproducibility is to be emphasized may be changed depending on an object included in the region-of-interest 113. If the object is, for example, a person's face or a license plate of a car, the texture information is important, so that the third image signal 109 is generated with an emphasis on the SN ratio. Specifically, the value of α is set high to increase the synthesis ratio of the first image signal 107.

In contrast, if the object is, for example, a person's clothes or a car's body, the color information is important, so that the third image signal 109 is generated with an emphasis on the color reproducibility. That is, the value of α is set small to increase the synthesis ratio of the second image signal 108. In order to determine the type of the object, for example, a feature point is detected in the region-of-interest 113 and is matched with the feature point information that has been registered in advance.

Although FIG. 4 illustrates a case in which the user specifies the region-of-interest 113 itself, the image capturing apparatus 100 may select the region-of-interest 113 by using another method. For example, the region-of-interest selecting unit 110 may select a range of an index (for example, a frame-shaped index (AE frame)) indicating the position and the size of the photometry region (AE region) set by the user to serve as the region-of-interest 113. Additionally, the region-of-interest selecting unit 110 may select a range of an index (for example, a frame-shaped index (AWB frame)) indicating the position and size of an automatic color balance adjustment region (AWB region), which is a specific region for determining a white balance correction value to serve as the region-of-interest 113. If the image capturing apparatus 100 has a mechanism for adjusting the focal position, the region-of-interest selecting unit 110 may select an index (for example, a frame-shaped index (AF frame)) indicating the position and the size of the current focus detection region (AF area) to serve as the region-of-interest 113.

Further, in the present embodiment, although only the third image signal 109 is displayed, either or both of the first image signal 107 and the second image signal 108 may be simultaneously displayed on the display unit 111. However, in particular, if the image capturing apparatus 100 transfers an image to the client apparatus via a network, it is preferable to display only the third image signal 109 because the larger the number of types of images to be displayed is, the larger the data amount is, thereby causing the delay of the displayed image.

Additionally, the image to be displayed may be changed depending on the shooting environment. For example, if a sufficient illuminance is obtained, α is set to 1, and the first image signal 107 is displayed. As the illuminance decreases, α is set smaller to continuously change the weight, and the third image signal 109, which is a synthesis image signal, is displayed. Eventually, α is set to 0 and the second image signal 108 is displayed.

Second Embodiment

In the image capturing apparatus according to the second embodiment, based on the information included in the region-of-interest 113 (for example, the spatial frequency or the SN ratio), a value other than α is also changed. Specifically, at least one of the accumulation time periods of the first image capturing element 103 and the second image capturing element 104 and the resolutions of the first image signal 107 and the second image signal 108 is changed. Thus, the third image signal 109 having a higher visibility can be generated.

First, a description will be given of a case where the resolution of an image is changed in accordance with the region-of-interest 113. In general, as the resolution of the image increase, the visibility for an object having a texture with a high spatial frequency increases. In contrast, if a plurality of pixel signals in the image capturing element are added and output, or an image is low-pass filtered, the SN ratio of the image improves due to the averaging effect. That is, the SN ratio of the image can be improved by reducing the resolution of the image.

Accordingly, in the image capturing apparatus according to the present embodiment, if the spatial frequency of the texture in the region-of-interest 113 is high, the control unit 106 increases the resolution with respect to the second image signal 108 from which an image having a relatively high SN ratio can be obtained with an emphasis on the visibility of the texture having a high spatial frequency. In contrast, with respect to the first image signal 107 having a relatively low SN ratio, the resolution is reduced with an emphasis on the SN ratio. Specifically, the control unit 106 brings the ratio of the resolution of the second image signal 108 to the resolution of the first image signal 107 closer to 1 as the spatial frequency of the texture of the region-of-interest 113 is lower. In contrast, as the spatial frequency of the texture in the region-of-interest 113 is higher, the control unit 106 increases the ratio of the resolution of the second image signal 108 to the resolution of the first image signal 107. In this way, it is possible to realize both the visibility for a texture having a high spatial frequency and the SN ratio of an image.

Note that it is preferable to change the resolution of the image not only in accordance with the spatial frequency of the texture in the region-of-interest 113 but also in accordance with the SN ratio. In the case where the SN ratio in the region-of-interest 113 is low, if the same resolution is used for the first image signal 107 and the second image signal 108, it is difficult to achieve both the visibility for a texture having a high spatial frequency and the SN ratio of the image.

Hence, as the SN ratio of the region-of-interest 113 becomes higher, the control unit 106 brings the ratio of the resolution of the second image signal 108 to the resolution of the first image signal 107 closer to 1. In contrast, as the SN ratio of the region-of-interest 113 becomes lower, the control unit 106 increases the ratio of the resolution of the second image signal 108 to the resolution of the first image signal 107 to ensure the visibility for a texture having a high spatial frequency in the second image and to suppress the decrease in the SN ratio in the first image. In this way, it is possible to realize both the visibility of a texture having a high spatial frequency and the suppression of the decrease in the SN ratio.

Next, a description will be given of a case where the accumulation time period of the image capturing element is changed based on the information included in the region-of-interest 113 (for example, a spatial frequency or an SN ratio). In general, as the accumulation time period is shorter, the shaking of a moving object becomes smaller, so that the visibility of an object having a large amount of motion improves. In contrast, as the accumulation time period is longer, an amount of a light incident to the pixels in the image capturing element increases, so that the SN ratio of the image improves.

Hence, in the image capturing apparatus according to the present embodiment, if the amount of motion of the region-of-interest 113 is large, the accumulation time period with respect to the second image signal 108, which can acquire an image having a relatively high SN ratio, is shortened with an emphasis on the visibility of an object having a large amount of motion. In contrast, the accumulation time period with respect to the first image signal 107, which acquires an image having is a relatively low SN ratio, is lengthened with an emphasis on the SN ratio. Specifically, the control unit 106 brings the ratio of the accumulation time period of the first image capturing element 103 to the accumulation time period of the second image capturing element 104 close to 1 as the amount of motion of the region-of-interest 113 is smaller. In contrast, as the amount of motion of the region-of-interest 113 is larger, the control unit 106 increases the ratio of the accumulation time period of the first image capturing element 103 to the accumulation time period of the second image capturing element 104. In this way, it is possible to realize both the visibility for an object having a large amount of motion and the SN ratio of an image.

Note that preferably the control unit 106 changes the accumulation time period of the image capturing element not only in accordance with the magnitude of the motion amount of the region-of-interest 113, but also in accordance with the SN ratio. In the case where the SN ratio in the region-of-interest 113 is low, if the same accumulation time period is used for the first image capturing element 103 and the second image capturing element 104, it is difficult to achieve both the visibility for an object having a large amount of motion and the SN ratio of an image.

Hence, the control unit 106 brings the ratio of the accumulation time period of the first image capturing element 103 to the accumulation time period of the second image capturing element 104 close to 1 as the SN ratio of the region-of-interest 113 becomes higher. In contrast, as the SN ratio of the region-of-interest 113 is lower, the control unit 106 increases the ratio of the accumulation time period of the first image capturing element 103 to the accumulation time period of the second image capturing element 104 to ensure the visibility for an object having a large amount of motion in the second image and to suppress the decrease in the SN ratio in the first image. In this way, it is possible to realize a balance between the visibility for an object having a large amount of motion and the suppression of the decrease in the SN ratio.

An amount of motion of the region-of-interest 113 may be determined as follows. First, the region-of-interest 113 is extracted from the third image signal 109 acquired in a plurality of frames. Then, a correlation coefficient is obtained while shifting the region-of-interest 113 in the in-plane direction, and an amount of shift having the highest correlation coefficient may be determined as the magnitude of the amount of motion.

Other Embodiments

Figure 5:
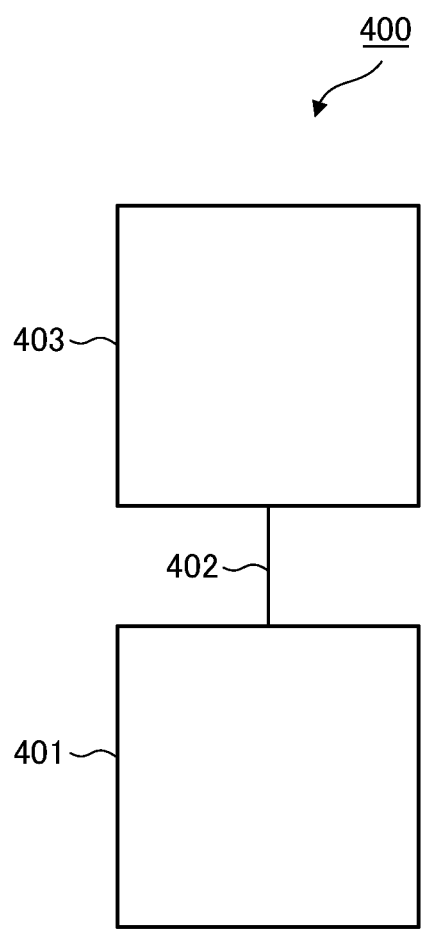
FIG. 5 is a block diagram illustrating an example of a monitoring system as an imaging system including an image capturing apparatus.

Note that the image capturing apparatus according to the embodiment may be connected to a client apparatus via a network so as to enable them to communicate with each other. FIG. 5 is a block diagram illustrating an example of a monitoring system 400 serving as an imaging system including an image capturing apparatus. The monitoring system 400 includes a client apparatus 401 and an image capturing apparatus 403. The client apparatus 401 transmits various commands that control the image capturing apparatus 403 via a network 402. In response to the command, the image capturing apparatus 403 transmits a response to the command and captured image data to the client apparatus 401. The shooting parameters of the image capturing apparatus 403 can be selected by the user from the client apparatus 401 side.

The client apparatus 401 is an external device such as a PC or a smartphone, and the network 402 can be configured by a wired LAN, a wireless LAN, and the like. The power supply may be supplied to the image capturing apparatus via the network 402.

Note that, although the above embodiment is configured such that light having different spectral characteristics is guided to the first image capturing element and the second image capturing element by the light separating unit 102, for example, filters having different spectral characteristics may be arranged in front of each of the first image capturing element and the second image capturing element. Additionally, the first image capturing element and the second image capturing element may be the two lens type that receives light through separate and independent optical systems rather than through the light separating unit 102. Furthermore, the first image capturing element and the second image capturing element may be configured such that pixels in which, for example, a spectral characteristic filter for the first image capturing element is disposed and pixels in which a spectral characteristic filter for the second image capturing element is disposed are alternately arranged in one image capturing element.

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-212461, filed Nov. 12, 2018, which is hereby incorporated by reference herein in its entirety.

What is claimed is:

1. An image processing apparatus comprising:
a memory that is coupled to at least one processor and stores one or more computer-readable instructions, wherein the one or more computer-readable instructions cause, when executed by the at least one processor, the at least one processor to function as:
an image synthesis unit configured to synthesize a visible light image and an infrared light image and generate a synthesis image;
a region specifying unit configured to specify a region in the synthesis image; and
an evaluation unit configured to evaluate a saturation of the synthesis image in the region specified by the region specifying unit,
wherein the image synthesis unit changes a synthesis ratio of the visible light image and the infrared light image in the synthesis image in accordance with the saturation that has been evaluated by the evaluation unit, and
wherein the image synthesis unit increases the synthesis ratio of the infrared light image as a spatial frequency of a texture in the specified region becomes higher.

2. The image processing apparatus according to claim 1, wherein the image synthesis unit changes the synthesis ratio of the visible light image and the infrared light image in accordance with an object included in the specified region.

3. The image processing apparatus according to claim 1, wherein the region specifying unit specifies a photometric region to serve as the region.

4. The image processing apparatus according to claim 1, wherein the region specifying unit specifies an automatic color balance adjusting region to serve as the region.

5. The image processing apparatus according to claim 1, wherein the region specifying unit specifies a focus detection region from which a focus position is detected by an imaging optical system including a mechanism that adjusts a focus position to serve as the region.

6. The image processing apparatus according to claim 1, wherein the one or more computer-readable instructions further cause, when executed by the at least one processor, the at least one processor to function as a control unit configured to change at least one of an accumulation time period of the visible light image, an accumulation time period of the infrared light image, a resolution of the visible light image, and a resolution of the infrared light image, based on the information included in the specified region.

7. The image processing apparatus according to claim 6, wherein the control unit brings a ratio of the resolution of the infrared light image to the resolution of the visible light image close to 1 as the spatial frequency of the texture in the specified region becomes lower, and increases the ratio of the resolution of the infrared light image to the resolution of the visible light image as the spatial frequency of the texture in the specified region becomes higher.

8. The image processing apparatus according to claim 6, wherein the control unit brings a ratio of the resolution of the infrared light image to the resolution of the visible light image close to 1 as the SN ratio of the specified region becomes higher, and increases the ratio of the resolution of the infrared light image to the resolution of the visible light image as the SN ratio of the specified region becomes lower.

9. The image processing apparatus according to claim 6, wherein the control unit brings a ratio of the accumulation time period of the visible light image to the accumulation time period of the infrared light image close to 1 as an amount of motion of the specified region becomes lower, and increases the ratio of the accumulation time period of the visible light image to the accumulation time period of the infrared light image as the amount of motion of the specified region becomes higher.

10. The image processing apparatus according to claim 6, wherein the control unit brings a ratio of the accumulation time period of the visible light image to the accumulation time period of the infrared light image close to 1 as the SN ratio of the specified region is higher, and increases the ratio of the accumulation time period of the visible light image to the accumulation time period of the infrared light image as the SN ratio of the specified region is lower.

11. An image processing apparatus comprising:
a memory that is coupled to at least one processor and stores one or more computer-readable instructions, wherein the one or more computer-readable instructions cause, when executed by the at least one processor, the at least one processor to function as:
an image synthesis unit configured to synthesize a visible light image and an infrared light image and generate a synthesis image;
a region specifying unit configured to specify a region in the synthesis image; and
an evaluation unit configured to evaluate a saturation of the synthesis image in a region specified by the region specifying unit,
wherein the image synthesis unit changes a synthesis ratio of the visible light image and the infrared light image in the synthesis image in accordance with the saturation that has been evaluated by the evaluation unit, and
wherein the image synthesis unit increases the synthesis ratio of the infrared light image as an SN ratio of the specified region becomes lower.

12. An imaging system including an image capturing apparatus and an information processing apparatus communicatively connected to the image capturing apparatus via a network, the imaging system comprising:
a memory that is coupled to at least one processor and stores one or more computer-readable instructions, wherein the one or more computer-readable instructions cause, when executed by the at least one processor, the at least one processor to function as:
an image synthesis unit configured to synthesize a visible light image and an infrared light image and generate a synthesis image;
a region specifying unit configured to specify a region in the synthesis image; and
an evaluation unit configured to evaluate a saturation of the synthesis image in the region specified by the region specifying unit,
wherein the image synthesis unit changes a synthesis ratio of the visible light image and the infrared light image in the synthesis image in accordance with the saturation that has been evaluated by the evaluation unit, and
wherein the image synthesis unit increases the synthesis ratio of the infrared light image as a spatial frequency of a texture in the specified region becomes higher.

13. The imaging system according to claim 12, wherein the image capturing apparatus comprises the image synthesis unit, the region specifying unit, and the evaluation unit.

14. The imaging system according to claim 12, wherein the image capturing apparatus includes the image synthesis unit and the evaluation unit, and wherein the information processing apparatus includes the region specifying unit.

15. The imaging system according to claim 12, wherein the image capturing apparatus includes the region specifying unit, and
wherein the information processing apparatus includes the image synthesis unit and the evaluation unit.

16. The imaging system according to claim 12, wherein the information processing apparatus includes the image synthesis unit, the region specifying unit, and the evaluation unit.

17. A non-transitory computer readable storage medium storing a program for causing a computer to function as each unit of an image processing apparatus, the image processing apparatus comprising:
an image synthesis unit configured to synthesize a visible light image and an infrared light image and generate a synthesis image;
a region specifying unit configured to specify a region in the synthesis image; and
an evaluation unit configured to evaluate a saturation of the synthesis image in the region specified by the region specifying unit,
wherein the image synthesis unit changes a synthesis ratio of the visible light image and the infrared light image in the synthesis image in accordance with the saturation that has been evaluated by the evaluation unit, and
wherein the image synthesis unit increases the synthesis ratio of the infrared light image as a spatial frequency of a texture in the specified region becomes higher.

18. A method for controlling an image processing apparatus comprising:
synthesizing a visible light image and an infrared light image and generating a synthesis image;
specifying a region in the synthesis image;
evaluating a saturation of the synthesis image in the specified region; and
changing a synthesis ratio of the visible light image and the infrared light image in the synthesis image in accordance with the evaluated saturation,
wherein the synthesis ratio of the infrared light image is increased as a spatial frequency of a texture in the specified region becomes higher.

* * * * *